United States Patent Office 3,042,536
Patented July 3, 1962

3,042,536
VINCULUM FOR POROUS ALKALINE EARTH METAL SILICATE INSULATING MATERIALS
Dana L. Bishop, Ottawa Lake, Mich., assignor, by mesne assignments, to Owens-Corning Fiberglas Corporation, a corporation of Delaware
No Drawing. Filed Oct. 22, 1957, Ser. No. 691,543
4 Claims. (Cl. 106—104)

The present invention relates to a vinculum (bonding material) for filling and insulating spaces between solid elements formed of porous alkaline earth metal silicate materials.

The porous alkaline earth metal silicate materials have found widespread acceptance in industry as insulating materials. One type of alkaline earth metal silicate is a calcium silicate material which is produced from an aqueous suspension of hydrated lime and silica, followed by exposure to elevated steam pressures and temperatures.

The foregoing materials are ultimately molded to a desired shape and converted to the dry solid state, and there find application as shaped structural elements where heat insulation is of prime importance. A common use of such shaped materials is their arrangement about steam conveying pipes where they are conveniently fastened for the purpose of retaining the heat within such pipes and thereby reducing heat loss. By contrast compositions of the type with which this invention is concerned find application in uniting or joining individual structural elements of the foregoing character, for example, elements formed of the porous alkaline earth metal silicate insulating materials. Thus, they may be used to bond together individual blocks of the insulating materials or they may be used in hand-fabricating an insulating structure as by hand-molding the vinculum about an elbow or other complicated piping arrangement which does not conform to the conventional shape of the preshaped or molded hydrous alkaline earth metal silicate elements.

An acceptable bonding material or vinculum should possess insulating qualities at least comparable to those of the solid structural elements formed of the insulating materials with which the vinculum is intended to be utilized. In addition, the vinculum should be capable of adhering satisfactorily to the structural elements, be capable of easy moldability to permit manual formation thereof into the desired shape, and be capable of effectively withstanding immersion in water without appreciable deterioration for an extended period of time.

While vinculum compositions of the type known heretofore have been, in general, acceptable, they have demonstrated at least one very serious shortcoming when used in conjunction with high temperature insulating materials. By high temperature insulating materials is meant porous alkaline earth metal silicate materials which retain their integrity, that is, resist cracking and disintegration when exposed continuously to temperatures of from 500° C. to 800° C. and above. One common example of a high temperature insulating material is "Xonotlite" a hydrous calcium silicate material disclosed in U.S. Patent Nos. 2,547,127 and 2,665,996 issued to G. L. Kalousek. In particular, is has been found that bonding materials known heretofore shrink, crack, and disintegrate at the elevated temperatures commonly encountered when they are employed in conjunction with such high temperature calcium silicate insulating materials.

It is also important that compositions of the type with which this invention is concerned retain a sufficient quantity of the water used in forming the mix to render it easily workable for a reasonable length of time.

Accordingly, it is an object of the present invention to provide a vinculum composition which possesses a desirable combination of the properties referred to hereinbefore.

It is a particular object of this invention to provide a vinculum composition which is possessed of exceptionally low shrinkage at elevated temperatures and, accordingly, possessed of extreme resistance to cracking and disintegration at such temperatures.

It is yet another object of this invention to provide such a composition which is characterized by marked water retention and consequent ease of workability and spreadability for an extended period after the aqueous mix has been prepared.

These and other objects of this invention will become apparent to those skilled in the art from the following detailed description in which certain preferred embodiments only are disclosed for the purpose of illustrating and not for limiting the nature of the invention.

In particular, I have found that a vinculum composition, according to this invention and having the foregoing properties, shall comprise a dry mixture including fines of the dried alkaline earth metal silicate insulating material, an anhydrous mineral silicate in fibrous form, and a hydraulic calcium aluminate cement. This dry mixture is added to water to form a thick paste which is capable of being manually formed and of retaining the shape into which it is formed, and which is also capable of being applied easily with a trowel or any of the other common types of cement-working tools. In a preferred composition of this invention, there is desirably included in the mixture a minor proportion of methyl cellulose which appears to function to enhance the workability of the vinculum composition in its paste-like form.

*Example I*

A preferred composition of this invention was prepared according to the following formulation in which the percentages indicated are by weight:

49% hydrous calcium silicate [1] fines; [2]
30% calcium aluminate cement (sold under the trademark "Lumnite");
20% AE amosite asbestos
1% methyl cellulose.

The formulation as described above was mixed with water in the proportion of 18 gallons of water to 100 lbs. of vinculum to thereby yield a thick paste-like slurry. The latter water vinculum slurry was capable of being easily spread and easily shaped to generally conform to complex shapes and structures as, for instance, pipe fittings i.e., "elbow" or T. Additionally, the aqueous mixture was found to possess exceptional water retention, thereby making possible hydration of the hydraulic calcium aluminate cement and manifesting an extended life of easy workability. The aqueous mixture retained the shape into which it was formed by hand, and was capable of supporting its own weight without distorting as the composition set. The aqueous mixture was also found to adhere very satisfactorily to solid structural insulating elements formed of hydrous alkali-metal silicate materials. As an example of the thermal insulating values obtained, the K-factor of the vinculum composition was found to be 0.55 B.t.u./hr./ft.$^2$/° F./in. at 200° F., and 0.80 at 400° F. Determination of the high temperature properties of the vinculum composition was obtained by ---
[1] The hydrous calcium silicate utilized was the reaction product in aqueous suspension of equi-molar quantities of lime (CaO) and finely comminuted silica under indurating conditions, e.g., saturated steam pressure in excess of 125 lbs. per square inch.
[2] The fines of footnote 1 were obtained by crushing the solid integrated product obtained from the induration reaction until the maximum particle size of the fines were such as to be capable of passing through a No. 8 mesh screen.

cutting a portion of the aqueous mixture into the form of a rectangular brick specimen having the following dimension: 12″ long and 2½″ by 1½″ in cross section. While in this form, the brick was dried and then placed in a high temperature furnace held at 1800° F. (982° C.) for a period of 24 hours. Upon removal from the furnace, the specimen was cooled in a desiccator. Measurements of the linear dimension of the brick after oven drying and after 24-hour exposure thereof at temperatures of about 1800° F. yielded, upon calculation, a shrinkage of only 1.02% for the composition herein described.

*Example II*

A composition of this invention was prepared according to the following formulation, in which the percentages listed are given by weight:

50% hydrous calcium silicate [1] fines (No. 8 mesh or less);
30% AE amosite asbestos;
20% calcium aluminate cement (sold under the trademark "Lumnite").

The absence of methyl cellulose in the composition herein described effected a decrease in the workability with the passage of time. In other words, it was found that when water was added in the manner described in Example I, the paste-like mixture was required to be rather quickly formed into the desired shape or the material would set-up. An oven-dried specimen prepared as described in Example II demonstrated shrinkage in the same order of magnitude as that yielded by the specimen described in Example I, e.g. 2% or less.

The amount of water to be combined with the dry vinculum composition of this invention may be varied within fairly wide limits. In general, too much water, e.g., more than 30 gallons of water to 100 lbs. of vinculum, will yield an aqueous mixture which is too fluid, and yielding, on setting, a product of less density than desired, and, subsequently, of reduced strength. Too little water, e.g., less than about 12 gallons of water to 100 lbs. of vinculum, will result in too thick a paste-like mixture and, as a consequence, such will be formed into the desired shape only with difficulty.

The shrinkage of the vinculum composition at elevated temperatures is important not only from the standpoint of the dimensional stability of the material but, more important, is also indicative of the degree of cracking and disintegration which can be expected under service conditions. It has been found that vinculum compositions used in accordance with this invention have shrinkage values which are less than 2%, and demonstrate almost no cracking or disintegration upon continued exposure to temperatures in the neighborhood of 1800° F. The foregoing is, of course, extremely desirable in vinculum compositions of the type with which this invention is concerned and, while the utilization of fines of a high temperature alkaline earth metal silicate material contributes principally to this property, it is found that the incorporation of amosite asbestos and calcium aluminate cement also contributes in a novel manner to the observed phenomena.

Silicate minerals, both natural occurring and synthetic, may have amorphous or crystal structures. The silicate mineral asbestos materials of this invention have crystalline structures and are, therefore, distinguished from glass, for example, which has an amorphous structure. Crystalline silicate mineral fibers are obtained from relatively few mineral families, the most important of which are the serpentines and the amphiboles. The serpentines, of which chrysotile, $3MgO \cdot 2SiO_2 \cdot 2H_2O$, is an example, are hydrous materials. On the other hand, this fibrous silicates of the invention are anhydrous and are, therefore, distinguished from the serpentines. Amosite, an anhydrous ferrous silicate found in Africa, is a fibrous asbestos illustrative of the fibrous silicates of the invention. Other examples of the anhydrous mineral silicates utilizable according to this invention are, for instance, crocidolite, $Na_2O \cdot Fe_2O_3 \cdot 2FeO \cdot 6SiO_2$; anthophyllite, essentially a silicate of iron and magnesium, usually with a little aluminum; tremolite, a relatively pure silicate of magnesium and calcium; actinolite, similar to tremolite, but containing, in addition, approximately 3% by weight FeO: and others descriptively named mountain leather and mountain cork.

The term "fibrous" as used herein contemplates a material existing as a substantially definite fiber as distinguished from a particle. A fiber may be conveniently considered as having a linear dimension at least several times as long as its cross-sectional dimension. Thus, I have found that asbestos materials having utility in forming the novel vinculum compositions of this invention can be conveniently classified as essentially anhydrous metal silicates in fibrous form. The anhydrous ferrous silicate mineral fibers such as amosite asbestos are preferred, however, because, so far as is known, they impart the greatest overall improvements to the vinculum compositions into which they are incorporated.

The alkaline earth metal silicate insulating materials from which the fines are prepared and utilized in the composition of this invention are preferably those insulating materials which exhibit integrity, e.g., dimensional stability, low shrinkage, absence of cracking and disintegration, at relatively elevated temperatures, e.g., above 500° C. for prolonged periods of time. Most preferable, because they exhibit the optimum of integrity, are the hydrous calcium silicate insulating materials. As indicated hereinbefore, such materials are preferably utilized in comminuted form such that they will pass through a No. 8 mesh wire screen. The hydrous calcium silicate insulating materials are composed primarily of the reaction product of lime and silica. The silica component may be quartz (99.8 $SiO_2$), silicic acid, tripoli, or other common sources of silica. Uusally, finely divided reactive lime is first combined with an excess of water and hydrated thereby by holding at a temperature of from about 150° F. to about 210° F. When the lime is completely hydrated, the source of silica is thoroughly mixed therewith, and the lime-silica slurry poured into a mold having the desired predetermined shape, and indurated under saturated steam pressure in the order of 125 lbs. to 250 lbs. per square inch, and a corresponding saturated steam temperature usually in excess of 178° C. The amount of lime and silica is desirably maintained within the following molar proportions: .8 to 1.0 mol of lime to 1.0 mol of silica.

The amount of water utilized in forming the reaction slurry of lime and silica is selected in accordance with the ultimate density desired. In general, the amount of water in parts per part of dry solids may range from about 0.75 to 1 to 10 to 1. The higher the ratio of water, the lower will be the apparent density of the ultimate product. As induration conditions are maintained, the slurry is gradually transformed to an integrated porous structure which is crystalline in nature.

The character and type of crystal resulting depends upon several factors. Most important of these factors are the mol ratio of lime to silica and the severity of the indurating conditions. A mol ratio of 0.8 mol lime to 1 mol of silica will favor the formation of plate-like crystals of Lepisil ($4CaO \cdot 5SiO_2 \cdot 5H_2O$). A mol ratio of from 0.95 to 1 mol of lime to 1 mol of silica will favor the formation of a porous structure of pure microcrystalline lath-like crystals of Xonotlite, $$5CaO \cdot 5SiO_2 \cdot H_2O$$

The latter crystalline form is also promoted by the maintenance of an indurating saturated steam pressure

---

[1] The hydrous calcium silicate utilized was the reaction product in aqueous suspension of equi-molar quantities of lime (CaO) and silica under indurating conditions, e.g., saturated steam pressure in excess of 125 lbs. per square inch.

of about 200 lbs. per square inch. Mol ratios intermediate those just described tend to favor a final structure which contains both Lepisil and Xonotlite. Lepisil is highly hydrated and presents resistance to the reception and transmission of heat. Xonotlite, being of low hydration, is resistant to very high temperatures, and is strong and relatively inert both chemically and physically. It has been found that the final porous calcium silicate insulating material should contain a substantial amount of Xonotlite in order that the product exhibit optimum performance at elevated temperatures. The calcium silicate insulating material utilized as a source of fines in the vinculum composition of this invention should most preferably be composed almost entirely of the long, thin, lath-like crystals of Xonotlite.

Compositions not of this invention, that is, composed of chrysotile, a hydrous magnesium silicate, and Portland cement (a hydraulic calcium silicate cement), in conjunction with fines of Lepisil exclusively exhibit shrinkage values of 5% or greater when tested in the manner described in Example I. As a consequence, these latter materials are less dimensionally stable and, what is more serious, are susceptible to frequent cracking and ultimate disintegration under service conditions, especially when subjected to prolonged exposure at elevated temperatures in the neighborhood of 500° C. to 800° C., or higher. The cracking and disintegration exhibited by these latter materials is much greater than would be expected by the difference in shrinkage values. In other words, materials exhibiting a shrinkage value of 5% or greater crack and disintegrate to a far greater extent than the materials of this invention, exhibiting a shrinkage value of 2% or less.

The exact nature of the contribution made by the incorporation of the calcium aluminate cement in the vinculum compositions of this invention is not known; however, it is believed that in its use as described, it is superior to the conventional Portland type cements because, although both types of cements are hydraulic in that they both obtain an initial set by reacting with water, the Portland cement loses its water at a lower temperature than does the calcium aluminate cement. Thus, my experience in preparing these vinculum compositions indicates that the calcium aluminate cement loses its water at the same temperature as that wherein its ceramic bond is effected.

Where spreadability or trowelability, consequent ease of shaping, and good self-supporting strength of the freshly applied vinculum are desired, methyl cellulose is desirably incorporated into the composition of this invention, and is most preferably added in such amount that it constitutes between 0.5% and 5.0% by weight of the dry weight of the composition. Its desirable effect of spreadability, etc., is believed caused by the retention of water in the formulation effected thereby, due to the inherent gelatinous nature of methyl cellulose.

Although there have been disclosed with considerable detail certain preferred embodiments of this invention, it is not intended or desired to be solely limited thereto, for procedures may be modified, precise proportions of materials utilized varied, and other materials having equivalent properties employed, as desired, without departing from the spirit and scope of the invention as defined in the appended claims.

The present application is a continuation-in-part of my application Serial No. 429,117 filed on May 11, 1954 and now abandoned.

I claim:

1. A vinculum composition for use pre-formed hydrous calcium silicate insulating materials, said vinculum comprising a dry comminuted mixture consisting essentially of about 49% by weight of an indurated reaction product of an aqueous suspension of reactive lime and silica in the molar ratio of about 0.95 to 1.0 mol of lime to about 1.0 mol of silica, about 20% amosite asbestos, about 30% hydraulic calcium aluminate cement, and about 1% powdered methyl cellulose.

2. A vinculum composition for use with shaped hydrous calcium silicate insulating materials exhibiting integrity at temperatures in the range of about 500 to 800° C. and comprising a dry comminuted mixture consisting essentially of the following ingredients within the ranges given and with the amount of each selected to give a total of 100%;

| Ingredients | Percent by weight |
| --- | --- |
| Hydrous calcium silicate fines (derived from an indurated reaction product of an aqueous suspension of reactive lime and silica) having a lime to silica ratio between about 0.8 and 1.0 mols of lime to about 1.0 mol of silica | About 50 |
| Anhydrous amphibole asbestos | 20–30 |
| Calcium aluminate cement | 20–30 |
| Methyl cellulose | 0–5 | said anhydrous asbestos being selected from the group consisting of amosite, crocidolite, anthophyllite, tremolite, actinolite, mountain leather and mountain cork.

3. A vinculum composition as claimed in claim 2 in which the hydrous calcium silicate fines are derived from an indurated reaction product of an aqueous suspension of reactive lime and silica having a lime to silica ratio of about 0.95 to 1 to thereby yield xonotlite fines.

4. A vinculum composition as claimed in claim 2 in which the hydrous calcium silicate fines are of such size as to be capable of passing through a No. 8 mesh screen.

References Cited in the file of this patent

UNITED STATES PATENTS

| | | |
| --- | --- | --- |
| 2,035,970 | MacIldowie | Mar. 31, 1936 |
| 2,432,971 | Ruthman et al. | Dec. 16, 1947 |
| 2,665,996 | Kalousek | Jan. 12, 1954 |
| 2,754,547 | Allen | July 17, 1956 |